April 5, 1932. W. C. ROE 1,851,985
CUTTER
Filed May 18, 1929 2 Sheets-Sheet 1
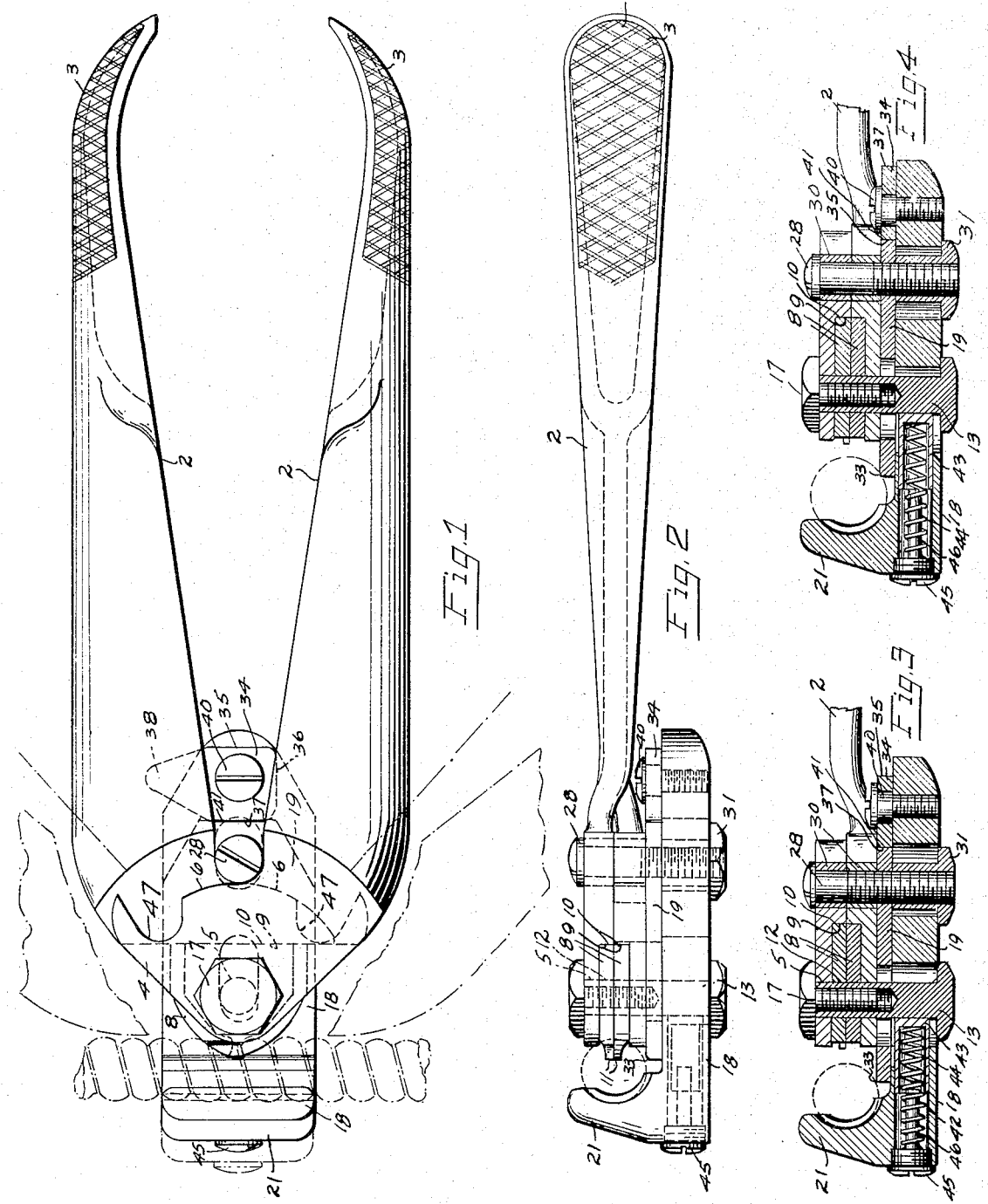
William C. Roe, Inventor
By Frank M. Slough
Attorney April 5, 1932. W. C. ROE 1,851,985
CUTTER
Filed May 18, 1929 2 Sheets-Sheet 2
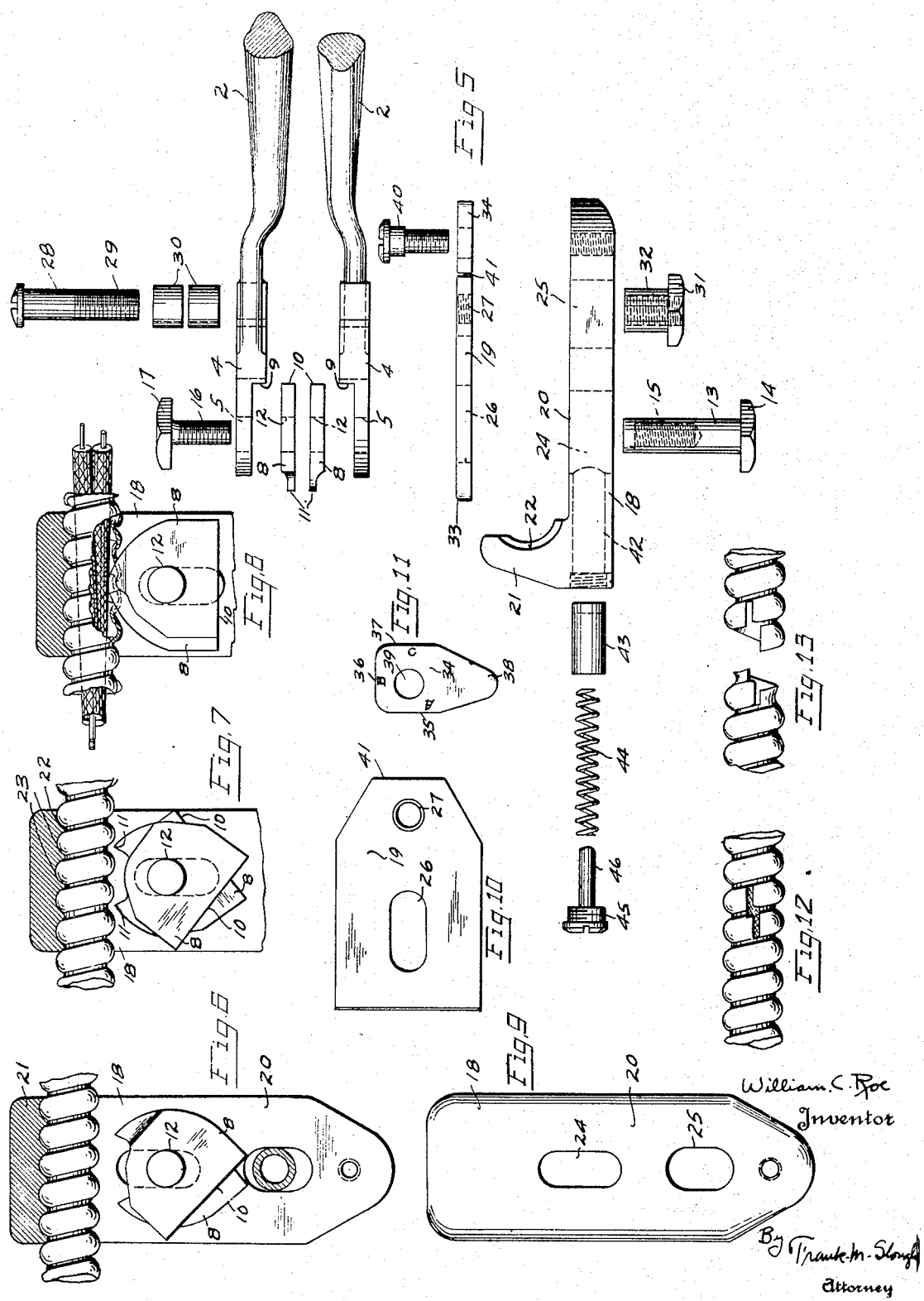
William C. Roe
Inventor
By Frank M. Slough
Attorney Patented Apr. 5, 1932

1,851,985

UNITED STATES PATENT OFFICE

WILLIAM C. ROE, OF ELYRIA, OHIO, ASSIGNOR TO TELKOR, INC., OF ELYRIA, OHIO, A CORPORATION OF OHIO

CUTTER

Application filed May 18, 1929. Serial No. 364,218.

My invention relates to cutting tools and relates more particularly to a tool particularly adapted for the cutting of spiral metallic armor for flexible armored conduits.

Flexible armored cable as commonly used for enclosing insulated electrical conductors of electrical power and lighting circuits varies in size depending upon the gauge and number of the enclosed conductors. The most common manner of cutting such armor is by use of a hacksaw, and is sometimes attended by a mutilation of both armor and conductors.

An object of my invention is to provide an improved cutting tool for cutting the armor of flexible armored conduits.

Another object of my invention is to provide for the cutting of such armor in such a way that the armor, alone, will be cut and the enclosed conductors left unmutilated.

Another object of my invention is to provide a cutting tool with self-aligning blades.

Another object of my invention is to provide a cutting tool, by the use of which the number of separate cutting operations incidental to cutting such armor may be reduced.

Another object of my invention is to provide a cutter for cable armor that can readily be pre-set to grip and cut armor of any of the usual sizes.

Another object of my invention is to provide a cutter wherein the armor need not be separately handled.

Another object of my invention is to provide a tool of the class described wherein cuts are simultaneously made in opposite directions.

Another object of my invention is to provide for so severing the armor that the ends of the armor may subsequently be readily parted by a simple manual twisting operation.

Another object of my invention is to provide for simultaneously gripping and cutting the armor by a simple manual movement.

Another object of my invention is to provide a cutting tool having inexpensive and easily replaceable cutting blades.

Another object of my invention is to provide a cutting tool wherein the cutting end of the tool is small adapting the same for insertion into limited corners or spaces.

Another object of my invention is to provide a cutting tool wherein the small strip of material that is sheared out by the blades is rolled outwardly or away from the enclosed conductors.

These and still other objects of my invention whereby an improved, highly efficient cutter is provided, will become more apparent from the following description, wherein reference is made to the accompanying drawings, forming a part of this specification and wherein:

Fig. 1 is a plan view of a cutter embodying the principles of my invention, certain hidden parts being shown by dotted lines and an alternate position of the handles also indicated by dotted lines, and wherein a section of cable armor is also shown by dotted lines, the cutters being shown in a closed position;

Fig. 2 is a side elevational view of the device of Fig. 1;

Fig. 3 is a vertical medial sectional view showing the jaw and cutters in an open position prior to a cutting operation;

Fig. 4 is a view similar to Fig. 3 but with the cutter adjusted to receive an armor of the larger type;

Fig. 5 is a so-called exploded view of the said cutter, the parts thereof being shown in side elevation and in their proper relative positions prior to assembling, the ends of the handles being indicated as broken away;

Figs. 6, 7, and 8 are fragmentary plan views of the jaw and armored cable therein. The relative positions of the cutter blades are shown respectively at the start and at the end of the cutting operation;

Fig. 9 is a bottom plan view of the jaw;

Fig. 10 is a plan view of an adjustable index plate;

Fig. 11 is a plan view of an adjusting dog;

Fig. 12 is an elevational view of a fragment of armor showing the cut made by the cutter;

Fig. 13 is an elevational view showing the two parts separated.

Referring now to the different figures of drawings wherein like parts are designated by like reference characters, a pair of operating levers or handles 2, provided with hand grips 3 at their free ends, in complementary pairs, have ends 4, adapted to support the gripping and cutting mechanism.

The operative end is broadened and is provided with a camming edge surface at 6, the purpose of which is later more fully described. The ends 4 are also adapted to be laterally superposed, each of the opposing adjacent faces being relieved to form a blade receiving recess for one of the two complementary cutter blades 8.

Each of the recesses is provided with an end wall 9 against which the butt 10 of the cutter blade abuts. The cutter blades are alike and are best shown in Figs. 5 to 8 inclusive, and are preferably of tool steel, each having a cutting edge 11 disposed opposite the butt side 10.

Each blade is apertured at 12, and a bearing bolt 13 is disposed therethrough being also extended through the apertures 5 of the handles, to hold the blades on the handles.

The bolt has a head 14 at one end and a central threaded bore 15 adapted to receive the threaded end 16 of a cap screw 17. It also has a smooth exterior surface which acts as the pivot bearing for the handles and blades and is of such a length that when the screw 17 is tightly screwed therein secured in superposed relation, the parts may still move freely.

A jaw 18 and index plate 19 are also secured to the levers in superposed relation by the bolt 13. The jaw, as best shown in Figs. 5, 7 and 9, comprises a substantially rectangular portion 20 which has an upstanding abutment 21 at one end. The inner face 22 of the abutment has a plurality of grooves 23 adapted to conform to the contour of an armored cable. A pair of elongated apertures 24 and 25 extend through the intermediate flat surface of the jaw, the bolt 13 extending through the aperture 24 and securing the jaw slidably to the handles. The upper face of the jaw is machined to provide a smooth flat surface which allows the plate 19 to be slid freely thereby.

The plate 19 is provided with an elongated aperture 26 in its mid-portion through which the bolt 13 is disposed and which allows the plate to slide longitudinally on the jaw. A screw threaded aperture 27 is also provided adapted to receive therein a post 28, which is threaded at its lower end 29 and provided with a smooth surface adjacent the head, adapted to have telescoped thereon a pair of like cylindrical cam rollers 30, and is locked to the plate 19 by lock nut 31 which has a relatively long shank 32, adapted to extend through the aperture 25 in the jaw element and lock the screw 28 securely to the plate 19 with the rollers freely rotatable thereon and with the post adapted to slide with the plate longitudinally of the jaw.

The upper edge of the plate 19 adjacent the jaw 21 has a beveled surface 33 which is adapted to support the cable armor prior to the cutting operation.

An adjusting dog 34 is provided which comprises a plate having a plurality of machined edges such as 35, 36 and 37 and which has a short thumb piece or lever 38 for moving the same. Each of the sides is positioned at a different distance from an intermediate aperture 39. The dog is pivotally secured to the jaw element, adjacent the end of the plate 19, by a screw 40, and may be rotated about the pivot to present a selected surface against the end portion 41 of the plate 19 preventing further longitudinal movement of the plate in the direction of the dog.

The jaw element has a longitudinal disposed bore 42 extending between the slot 24 and the end of the jaw parallel to the flat upper surface. A plunger 43 is disposed in the bore and is spring pressed toward the aperture 24 by helical spring 44. A cap 45 which has a guide stem 46 for the spring, is screw threaded into the end of the bore retaining the spring and plunger in spring pressed relation with the plunger abutting bolt 13. The pressure upon the bolt 13 tends to force the jaw forward longitudinally relative to the handles. The forward position of the jaw being adjustably limited by the position of the dog 34. The pressure of the plunger 42 upon the post 13 is transmitted to the handles, retaining the camming faces 6 thereon in contact with the cam rollers 30.

When it is desired to cut the armor of a conduit, the dog 34 is first set to the correct position for the size of the armor to be cut. The handles or levers are then spread apart, as shown by the dotted lines in Fig. 1, which advance the jaw and in which position the rollers are disposed in the notches 47 on camming surfaces 6. The armor cable is then inserted in the recess provided by the jaw end and at a point where it is desired to sever the armor and the convolutions of the cable will engage the corresponding grooves 23 in the jaw element.

The relative position of the cutter blades and the armor is best shown in Figs. 3 and 6, the armor being supported by the bevelled edge 33 of the plate 19 which is retained in an adjusted position by the dog 34.

The handles are then forced towards each other causing the rollers 30 to be forced from the notches 47, which draw the jaw and armor toward the cutter blades, after which they ride upon the surface 6. The notch 47 is of such a depth as to cause the jaw and armor to be drawn toward the blades into contact therewith.

With the tool constructed as described, the notches 47 cause the jaw to retain the armor and cutting blades centered so that the jaw cannot swing sideways until the blades contact with the armor, this position being shown in Fig. 7. Further movement of the handles toward each other moves the blades in the radius of a circle with the bearing bolt 13 as the pivot, the cam surface 6 being concentric to the bolt 13, preventing further longitudinal movement of the jaw relative to the handles and blades.

The blades engage the armor, pressing the armor into the grooves of the jaw, the combination of the jaw on one side and blades on the other forming a vise holding the armor immovable in any direction. The blades engage the armor wall as shown in Fig. 8 at the base of two adjacent convolutions.

The blades are forced into the armor and cut through it from opposite sides of the convolutions cutting from the armor, through one and one-half convolutions, a ribbon-like section, best shown in Figs. 8 and 12.

The handles are then spread and the armor removed from the cutter after which the sections of the armor may be parted by unscrewing the same about a half turn, the disconnected armor being shown in Fig. 13. The armor is left in such a condition as to be ready for insertion into a proper fitting for junction box assembly without further operations thereon.

The cutter blades may be readily replaced by unscrewing the cap screw 17 from the bolt 13 and inserting new blades. The indexing dog 34 may be provided with a suitable indicia as "A" "B" and "C" adjacent to the surfaces 35, 36 and 37 to indicate the size of armor for which the tool is set to cut. The dog may be readily shifted when the arms are in the spread position and causes the jaw to be advanced toward or retarded from the cutter blades and plate 19, two different adjusted positions for the two separate armors being shown in Figs. 3 and 4 respectively.

Having thus described my invention, I am aware that numerous and extensive departures may be made from the embodiment herein illustrated and described but without departing from the spirit of my invention.

I claim:

1. In a cutter for articulated tubular armor, the combination with a pair of pivoted handles, a cutter blade carried at the forward end of each handle, a reciprocating element slidably supported by the handles and terminating in an armor engaging jaw positioned beyond and spaced from the forward ends of said blades, and means operative responsive to relative pivotal movement of the handles to effect a shearing movement of the blades and an inward movement of said jaw toward said blades during a part only of said shearing movement.

2. A cutter for articulated tubular conduit comprising a pair of cutting plier blades, pivoted handles for effecting a plier cutting movement of the blades, a reciprocable block slidably carried by the handles provided with a jaw at its forward end, said jaw adapted for disposition on the opposite side of a piece of conduit relative to said blades, and camming means operable responsive to a blade operating movement of said handles adapted to bring the blades and jaw closer together to hold the conduit in substantially fixed operative relation to the blades, said blades being so related to said handles as to perform a shearing operation on a wall of said conduit, responsive to a continued movement of said handles.

3. In a cutter for articulated metallic tubular cable, the combination with a jaw element comprising a body portion and an abutment portion, a pair of cutting plier elements, each comprising a forwardly disposed cutting blade and a rearwardly extending handle, means for yieldably securing the forward end portions of said plier elements and said body portion together, the abutment being disposed in spaced relation to said blades, means responsive to a blade opening movement of said plier handles, comprising a spring for relatively reciprocating said plier elements and said jaw element to move the abutment farther from the blades, and means responsive to a blade closing handle movement to move the abutment toward the blades.

4. In a cutter for articulated metallic tubular cable, the combination with a jaw element comprising a body portion and an abutment portion, a pair of cutting plier elements, each comprising a forwardly disposed cutting blade and a rearwardly extending handle, means for yieldably securing the forward end portions of said plier elements and said body portion together, the abutment being disposed in spaced relation to said blades, means responsive to a blade opening movement of said plier handles, comprising a spring for relatively reciprocating said plier elements and said jaw element to move the abutment farther from the blades, and means responsive to an initial blade closing handle movement to move the abutment toward the blades, and means to support said jaw element in a substantially fixed spaced position relative to said blades during the concluding portion of the shearing movement of the blades.

5. In a cutter for articulated metallic tubular cable, the combination with a jaw element comprising a body portion and an abutment portion, a pair of cutting plier elements, each comprising a forwardly disposed cutting blade and a rearwardly extending handle, means for yieldably securing the forward end portions of said plier elements and said body portion together, the abutment being disposed in spaced relation to said blades, means responsive to a blade opening movement of said plier handles, comprising a spring for relatively reciprocating said plier elements and said jaw element to move the abutment farther from the blades, and means responsive to a blade closing handle movement to move the abutment toward the blades, and an adjustable stop adapted adjustably to predetermine the spaced relation between the abutment and the blades at the opened and closed positions of the blades.

6. In a plier cutter for articulated metallic conduit, the combination with a flattened L-shaped block, having a shorter arm with its inner surface so formed as to provide a conduit engaging jaw, a post projecting inwardly from an end portion of the longer arm, a pair of plier cutting elements comprising a pair of rearwardly extending handles and a pair of forwardly extending cutting blades, a bolt projected through the forward portions of said plier elements to pivotally join them together, said longer arm being intermediately apertured, an extension of the bolt projected loosely through the arm aperture and terminating in a retaining head, said elements provided with camming edge surfaces disposed rearwardly of their blades adapted for camming engagement with said post, spring means adapted to continuously exert a resilient pressure effort tending to maintain the camming edges of said plier elements in engagement with said post and to maintain the jaw in proper spaced relation to the blades.

7. In a plier cutter for articulated metallic conduit, the combination with a flattened L-shaped block, having a shorter arm with its inner surface so formed as to provide a conduit engaging jaw, a slide plate, a post projecting inwardly from an end portion of the slide plate, a pair of plier cutting elements comprising a pair of rearwardly extending handles and a pair of forwardly extending cutting blades, said plate superposed on the inner surface of the block, a bolt projected through the forward portions of said plier elements to pivotally join them together, said longer arm and said slide plate being apertured, an extension of the bolt projected loosely through the arm and plate apertures and terminating in a retaining head disposed on the outer surface of the longer arm, said elements provided with camming edge surfaces disposed rearwardly of their blades adapted for camming engagement with said post, spring means adapted to continuously exert a resilient pressure effort tending to maintain the camming edges of said plier elements in engagement with said post and to maintain the jaw in proper spaced relation to the blades, and means for adjusting said plate on said block to fixedly adjust the normal spacing between said jaw and said blades.

8. A plier for longitudinally slitting a generally cylindrical article, comprising a pair of pivotally connected handles, shear blades supported by said handles, and a jaw element carried thereby, having a jaw projected forwardly of the ends of the blades and adapted to restrain movement of the work from the blades during engagement of the blades therewith, and means associated with said handles and said jaw element adapted to effect inward movement of the jaw to a fixed position relative to the blades during operative movement of said handles.

9. A plier for longitudinally slitting a tubular article, comprising a pair of pivotally connected handles shear blades supported by said handles and a jaw element non-rotatably carried thereby, having a jaw projected forwardly of the ends of the blades and adapted to restrain movement of the work from the blades during engagement of the blades therewith, and means associated with said handles and said jaw element, adapted to effect inward movement of the jaw to a fixed position relative to the blades during operative movement of said handles.

10. A plier for longitudinally slitting a tubular article, comprising a pair of pivotally connected handles shear blades supported by said handles and a jaw element non-rotatably carried thereby, having a jaw projected forwardly of the ends of the blades and adapted to restrain movement of the work from the blades during engagement of the blades therewith, and means associated with said handles and said jaw element, adapted to effect an inward movement of said jaw toward the end of the blades during a part only of an operative movement of said handles.

11. A cutter comprising a pair of cutting pliers and a jaw disposed longitudinally in front of the cutters thereof and spaced therefrom, and means associated with said jaw and pliers to cause said jaw and cutters to effect a relative approaching movement responsive to a closing movement of said pliers, said means including means to hold said jaw stationary, relatively to the cutters, after a preliminary operation of said pliers and while the cutting operation thereof is continued.

12. A cutter comprising a pair of plier elements, each having a handle portion at one end and a forwardly projecting cutter blade portion at the other end, said plier elements being pivotally secured together near to but rearwardly of said cutter blade portions projecting forwardly thereof, an article retaining jaw positioned forwardly of the forwardly disposed ends of said cutter blades, and means interconnecting said plier elements and said jaw adapted to retract the jaw rearwardly responsive to relatively approaching movements of said handle portions, said means including a movement transmission means to cause substantially all of the movement of the jaw to occur during the first part of the approaching movements of the handle portions.

13. A cutter comprising a pair of plier elements, each having a handle portion at one end and a forwardly projecting cutter blade portion at the other end, said plier elements being pivotally secured together near to but rearwardly of said cutter blade portions projecting forwardly thereof, an article retaining jaw positioned forwardly of the forwardly disposed ends of said cutter blades, and means interconnecting said plier elements and said jaw adapted to retract the jaw rearwardly responsive to relatively approaching movements of said handle portions, said means including a cam and a cam follower to cause substantially all of the movement of the jaw to occur during the first part of the approaching movements of the handle portions.

14. A cutter comprising a pair of plier elements, each having a handle portion at one end and a forwardly projecting cutter blade portion at the other end, said plier elements being pivotally secured together near to but rearwardly of said cutter blade portions projecting forwardly thereof, an article retaining jaw positioned forwardly of the forwardly disposed ends of said cutter blades, and means interconnecting said plier elements and said jaw adapted to retract the jaw rearwardly responsive to relatively approaching movements of said handle portions, said means including a cam follower and a cam having a surface formed to cause substantially all of the movement of the jaw to occur during the first part of the approaching movements of the handle portions.

In testimony whereof I hereunto affix my signature this 10th day of May, 1929.

WILLIAM C. ROE.